United States Patent

Harvey et al.

[15] 3,693,521
[45] Sept. 26, 1972

[54] LATCH AND PRESSURE-APPLYING DEVICE

[72] Inventors: Donald M. Harvey; Chester W. Michatek, both of Rochester, N.Y.

[73] Assignee: Eastman Kodak Company, Rochester, N.Y.

[22] Filed: April 2, 1971

[21] Appl. No.: 130,752

[52] U.S. Cl. .................................95/13, 95/11 R
[51] Int. Cl. .................................G03b 17/50
[58] Field of Search............95/13, 11 R; 292/31, 101

[56] References Cited

UNITED STATES PATENTS 3,350,990  11/1967  Finelli et al.....................95/13
3,358,574  12/1967  Liverano......................95/11 R
3,225,670  12/1965  Friedman et al...............95/13
3,455,222  7/1969  Downey........................95/13

Primary Examiner—Samuel S. Matthews
Assistant Examiner—Richard L. Moses
Attorney—W. H. J. Kline and J. Addison Mathews

[57] ABSTRACT

A self-processing camera is provided with a novel latch and pressure-applying device that releasably latches the camera's loading door in its closed position and applies resilient nip pressure directly to the film processing members without imposing substantial corresponding forces on the door or the camera housing.

9 Claims, 8 Drawing Figures

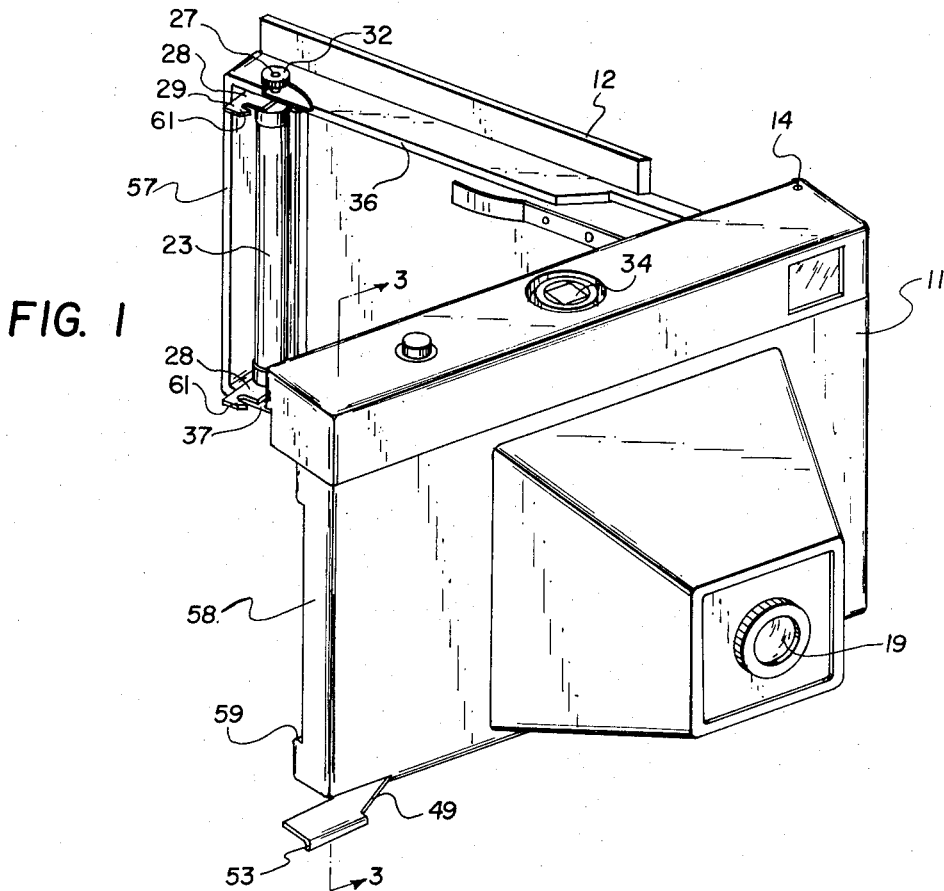
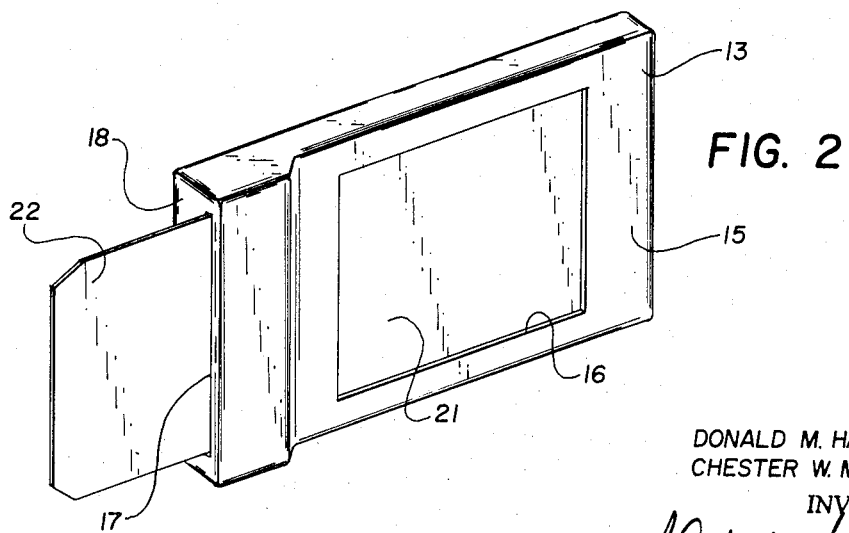

DONALD M. HARVEY
CHESTER W. MICHATEK
INVENTOR.

BY
ATTORNEYS

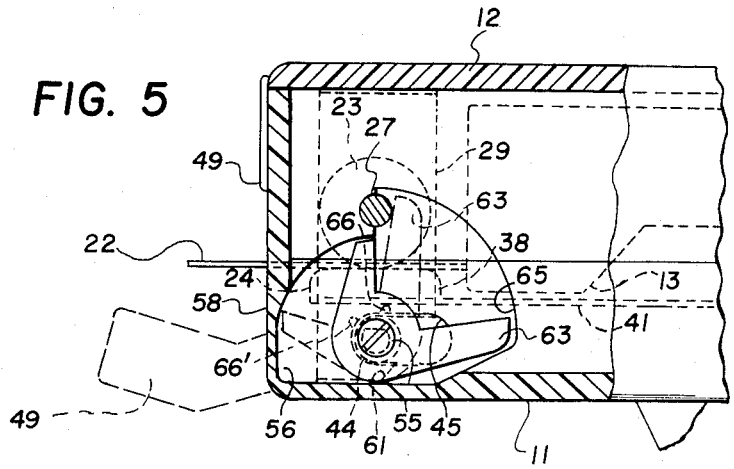
FIG. 5
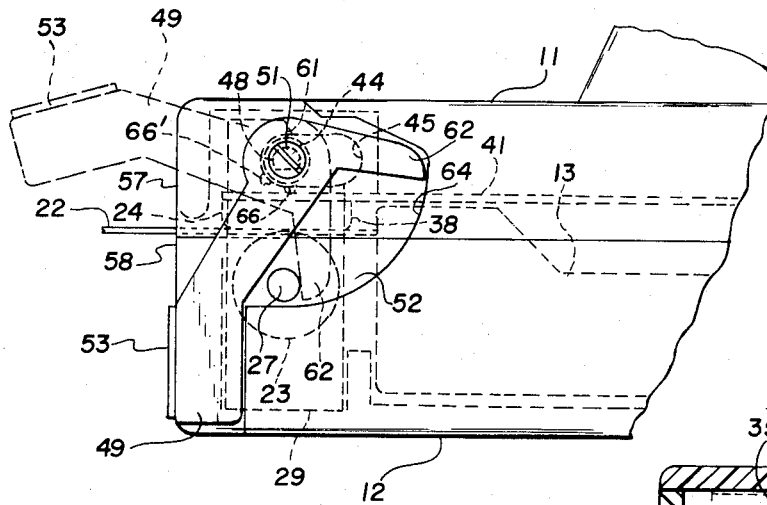
FIG. 6
FIG. 7
FIG. 8
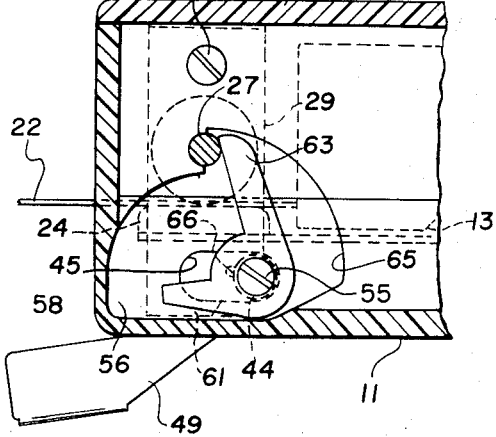
DONALD M. HARVEY
CHESTER W. MICHATEK
INVENTORS
BY *J. Addey Mathew*
*W. H. J. Kline*
ATTORNEYS

LATCH AND PRESSURE-APPLYING DEVICE

BACKGROUND OF THE INVENTION

The present invention relates to self-processing cameras of the type in which an exposed film unit is processed by being drawn through a nip between a pair of opposed processing members, and more particularly to novel means incorporated in such a camera for latching its loading door and applying resilient nip pressure between its processing members.

In cameras and other photographic apparatus using self-processing film units, juxtaposed pressure-applying members generally are provided for distributing a viscous composition across the units to effect their processing. While such pressure members may take any of a variety of forms, including rotatable rollers or stationary bars, they are generally urged towards each other with a relatively high resilient tensioning force of 5 to 9 pounds.

The magnitude of this necessary tensioning force causes numerous problems in the design of such apparatus, especially where the pressure members are mounted on separable camera parts, such as the body of the apparatus and its loading or cover door. By way of example only, and referring to previously known apparatus, normally inexpensive plastic camera parts had to be reinforced with metallic or other strengthening members for accommodating the resilient forces between the pressure members. Again, this was especially difficult where such forces were translated across parting lines of separable parts of the apparatus, such as the body and loading door of a photographic camera. Additionally, it was common to tension the pressure-applying members upon closing of the loading or cover door, and this often significantly increased the force necessary to close the door, at least immediately prior to its being latched in the closed position. Similarly, relatively rigid or reinforced structures were required for the door.

SUMMARY OF THE INVENTION

In accordance with the present invention, a latch and pressure-applying mechanism is provided for translating pressure-applying forces to and between a pair of separable pressure-applying members in processing photographic apparatus. The mechanism is especially adapted to permit closing movement of the members with very little resistance. After completion of the closing movement, the mechanism is energized to apply resilient pressure through a translating arm and directly to the pressure members without imposing substantial corresponding forces on surrounding housing and mounting structure.

In a preferred embodiment of the invention, a photographic camera is provided with a pair of pressure-applying processing members, one mounted on the camera body, and the other mounted on a film-loading or cover door. The processing member mounted in the cover door is received at its ends in a latching bracket that extends toward and is adapted to latchably engage the camera body when the cover door is moved from an open to a closed position. A pressure-applying bar, received in the camera body, is engaged by the latching bracket upon closing the cover door, and then the bar can be rotated to apply pressure to the processing members through the bracket. Since pressure is not applied to the processings members until after the cover door is closed, the pressure-applying device does not offer resistance to closing of the door. Also, since the pressure or force is exerted through the latching bracket, a plastic camera body and its door need not be strengthened to accommodate such forces.

BRIEF DESCRIPTION OF THE DRAWINGS

In the drawings:

FIG. 1 is a perspective view of a self-processing camera according to a preferred embodiment of the present invention, illustrated with its loading door in a partially open position;

FIG. 2 is a perspective view of a film pack adapted to be used in the illustrative camera shown in FIG. 1;

FIG. 5 is a cross-sectional view taken along line 5—5 of FIG. 3 showing the latching and pressure-applying device in solid lines in its latched condition and in broken lines in a partially unlatched condition;

FIG. 6 is a bottom view of the portion of the camera comprising the subject latching and pressure-applying device, illustrating the same conditions depicted in claim 5;

FIG. 7 corresponds to FIG. 5 but shows the latching and pressure-applying device in its fully unlatched condition; and FIG. 8 corresponds to FIG. 6 but shows the illustrated device in the same condition depicted in FIG. 7.

DESCRIPTION OF THE PREFERRED EMBODIMENT

Figure 3:
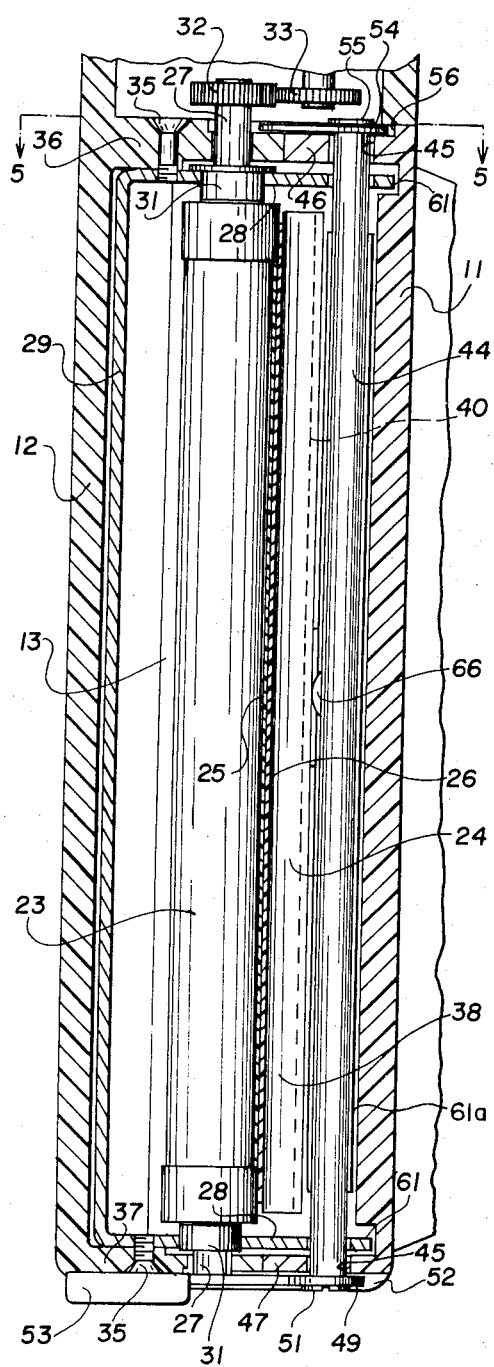
FIG. 3 is a fragmentary, partially cross-sectioned, end elevational view taken along line 3—3 of FIG. 1, with the loading door of the camera shown in its closed position and with a film unit depicted in the process of being drawn between the processing members.

The camera shown in the accompanying drawings illustrates the preferred embodiment of the invention, comprising a box-like housing 11 provided with a hinged loading door 12 that can be opened to allow a film pack 13 (FIG. 2) to be installed in the camera. Both the housing and the loading door are preferably made of injection-molded plastic material and are connected to each other by a hinge pin 14. The film pack 13, which is best illustrated in FIG. 2, is not a part of the present invention and need not be described in detail for purposes of the present disclosure. Briefly, however, the film pack comprises a metal or plastic casing 15 provided with a forwardly facing exposure window 16 and with an elongate slot 17 in its end wall 18. When the film pack is loaded into the camera, its window 16 is located in rearward alignment with the camera lens 19 so that the film sheet available for exposure in the film pack lies coincident with a focal plane of the lens. A plurality of self-processing film units are stacked within the housing behind an opaque mask sheet 21. The mask sheet initially covers window 16 and is provided with a leader strip 22 extending through slot 17. Each film unit includes a similar leader strip, and means are provided whereby the removal of the mask sheet brings the leader strip of the first available film unit through slot 17. Similarly, the successive removal of each film unit brings the leader strip of the next available unit to this same position. As is well known in the art of self-processing cameras, the removal of each successive exposed film unit causes its rupturable container of processing fluid to be drawn between a pair of opposed processing members 23 and 24, which rupture the container and distribute the processing fluid between two sandwiched sheets of the film unit shown at numerals 25 and 26 in FIG. 3.

In accordance with the preferred embodiment of the present invention, the rearward processing member 23 takes the form of a roller rotatably supported by its end shafts 27, which are journaled to the upper and lower arms 28 of bracket member 29 by bearing bushings 31 (FIG. 3). As shown at numeral 32, a spur gear is attached to the upper roller shaft 27. Gear 32 is not directly involved in the present invention, but is adapted to engage with a mating gear 33, shown in FIG. 3, to translate the rotation of roller 23 into intermittent rotative movement of a multiple flash lamp socket member depicted at numeral 34 in FIG. 1. Bracket member 29 is mounted to the loading door by screws 35 extending through the upper and lower walls 36 and 37 of that door.

The forward processing member 24 comprises a pressure bar 38 attached by screws 39 (FIG. 4) to the vertical cross bar 40 of a support plate 41, which is secured to the camera housing by screws 42 and provided with a central resilient tongue 43. As disclosed in commonly assigned copending U.S. Pat. application Ser. No. 130,753 entitled MULTIPLE FUNCTION FRAME MEMBER FOR CAMERAS and filed in the name(s) of D. M. Harvey and C. W. Michatek on even date herewith, the support plate can also serve to position the film pack and to perform other functions in addition to supporting the pressure bar.

Figure 4:
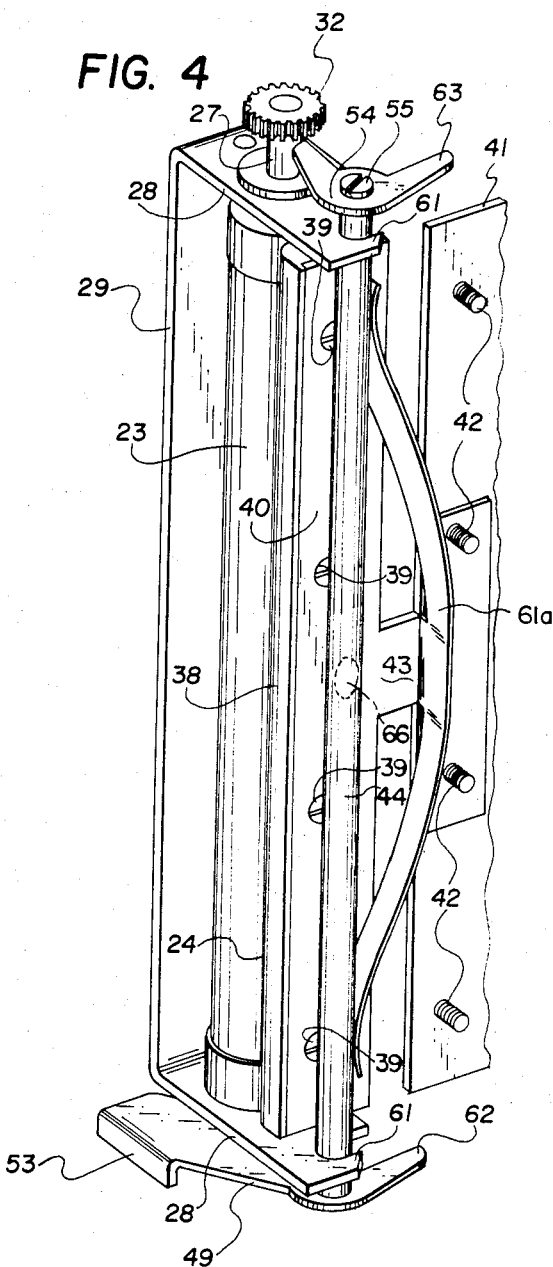
FIG. 4 is a perspective view of the latching and pressure-applying device illustrated in FIG. 3.

As best shown in FIGS. 3 and 4, a cylindrical latching rod or bar 44 is located forwardly of the forward processing member 24 and extends through elongate holes 45 in the intermediate and lower walls 46 and 47 of the camera housing, which are respectively aligned with the upper and lower walls of the loading door when the latter is closed. At its lower end, the latching rod is provided with an irregularly shaped projection 48 shown in FIG. 6, which is received in a mating hole in operating lever 49 to prevent relative rotation between the rod and that lever. The operating lever, in turn, is positively attached to the latching rod by a screw 51 and is received in a shallow recess 52 in the bottom wall members of the camera housing and the loading door. At its accessible end, the operating lever includes a downwardly projecting lip 53 by which it can conveniently be moved. The upper end of the latching rod is similarly provided with a coordinating lever 54 which is secured to the rod in the same manner just described by a screw 55 and received in a shallow recess 56 in the intermediate housing wall member and the top loading door wall member. As explained below, the coordinating lever serves to coordinate the movement of the opposite ends of the latching rod so that the latter always remains substantially parallel to the processing members.

Closing the loading door positions its end wall 57 (FIG. 1) adjacent to end wall 58 of the housing, which is notched as shown at numeral 59 to provide an opening through which the mask strip and the film units are withdrawn from the camera. With the door in that position, the upper and lower arms 28 of bracket member 29 extend into the housing and straddle the corresponding upper and lower ends of the forward processing member. The forward ends of the bracket arms are provided with substantially identical latching ears 61 adapted to engage rod 44 when the door is latched as illustrated in FIGS. 3 through 6. A resilient spring 61a normally urges and maintains the rod 44 in a position for latching engagement with the ears 61. However, the rod can be moved away from such latching position either as the cover door is closed, by camming surfaces on ears 61, or in response to movement of the operating lever to the unlatching position, as described hereinafter.

The forward processing member or pressure bar 38 is trapped behind the latching rod and is engaged by a pressure-applying protuberance or lobe 66 projecting rearwardly from the center of the latching rod. Although not evident in the drawings, the engagement of protuberance 66 with the forward processing member 38 springs the latching rod 44 somewhat to provide the desired amount of resilient nip pressure between the two processing members. Inasmuch as the latching rod 44 is engaged directly with the bracket member, 29 which also supports the rearward processing member 23, it will be apparent that considerable nip pressure can therefore be developed without imparting corresponding force to the camera housing or to the loading door.

As a film unit is withdrawn from the camera, the processing fluid container is ruptured by passing between the two processing members 23 and 38 and the processing fluid is distributed between the two confronting film unit sheets 25 and 26 as shown in FIG. 3. Because the protuberance 66 on the latching rod 44 engages the center of the forward processing member 38 in alignment with flexible tongue 43, the forward processing member can accommodate itself to the rearward processing member even if those members are not initially in perfectly parallel relation to each other. Furthermore, applying the biasing pressure to the center of the forward processing member makes it considerably easier to control the resulting bending of that member than would be the case if such pressure were applied at its ends.

To release the latching device, the operating lever is rotated toward the front of the camera to the position shown in FIGS. 1, 7 and 8. During such movement, the latching rod or bar rotates in a counterclockwise direction, as viewed from the top. By the time the unlatching movement of the operating lever has proceeded to the position shown in broken lines in FIGS. 5 and 6, the corresponding rotation of the latching bar has disengaged its protuberance from the forward processing member as shown at 66' in FIGS. 5 and 6 and has therefore relieved the resilient pressure between the two processing members. Simultaneously, fingers 62 and 63 of the respective operating and coordinating levers have engaged the corresponding end shafts 27 of roller 23. Consequently, the end shafts of the roller provide fulcrum points for fingers 62 and 63, whereby continuing movement of the operating lever causes both ends of the latching rod to move in unison as the latter shifts laterally out of engagement with the bracket member. When the operating lever has completed its movement to the position shown in FIGS. 7 and 8, the latching rod is completely free of the bracket member, thus allowing the loading door to be opened.

After a new film pack has been loaded into the camera, the loading door is manually closed with the accessible film pack leader strip positioned between the processing members and extending through the opening provided by notch 59 in the end wall of the camera housing. As the loading door moves to its fully closed position, the rod 44 snaps around the camming surface of latching ears 61 and into latching engagement therewith. The operating lever is then moved to its latching position to rotate the pressure-applying protuberance 66 into engagement with the forward processing member 38 and bring it slightly past center so that its toggle action tends to maintain the operating lever in its latched position. Accordingly, the loading door is again latched in its closed condition and the processing members are again biased together by the predetermined resilient force required to effect proper subsequent processing of the film units.

The invention has been described in detail with particular reference to the preferred embodiment thereof, but it will be understood that variations and modifications can be effected within the spirit and scope of the invention.

We claim:

1. In a photographic camera for exposing and initiating processing of self-processing film units, the camera including a pair of processing members mounted for substantial relative movement between juxtaposed and separated locations, the improvement comprising:
   latching means for maintaining the processing members in their juxtaposed locations; and
   pressure-applying means movable between first and second positions while said latching means is maintaining the processing members in their juxtaposed locations, said pressure-applying means when moved to said first position applying a resilient force to the processing members through said latching means, said pressure-applying means when moved to said second position releasing said resilient force, said pressure-applying means when in said second position offering little or no resistance to relative movement of the processing members to their juxtaposed locations.

2. A camera for use with self-processing photographic film units, said camera comprising:
   a body portion defining a cavity for receiving the film units;
   a first processing member mounted on said body portion for engaging one of the film units when withdrawn from said cavity;
   a cover door movable an open position permitting loading of the film units into said cavity and a closed position covering said cavity;
   a second processing member mounted on said cover door and movable therewith between a location spaced from said first processing member and a location juxtaposed with said first processing member;
   a latching member on one of said body portion and said cover door for latching said cover door in said closed position; and
   pressure-applying means on the other of said body portion and said cover door and engageable with said latching member when said cover door is latched in said closed position for applying compressive pressure to said processing members through said latching member.

3. The camera claimed in claim 2 wherein said pressure-applying means is movable to and from a pressure-applying position when said cover door is latched in said closed position, said compressive pressure being applied to said processing members only when said pressure-applying means is in said pressure-applying position.

4. In a self-processing camera in which an exposed film unit is processed by being moved through a nip defined by confronting first and second processing members, said camera including a housing and a loading door movable between an open position and a closed position, the improvement comprising:
   first supporting means for resiliently supporting said first processing member on one of said housing and said door;
   second supporting means for supporting said second processing member on the other of said housing and said door;
   a latching member mounted on said one of said housing and said door for movement between a first position in which said latching member is engaged with said second supporting means when said door is in said closed position and a second position in which said latching member is disengaged from said second supporting means; and
   pressure-applying means carried by said latching member for applying a force through said second supporting means to urge said processing members toward each other while said latching member is in said first position.

5. The improvement claimed in claim 4 wherein said first processing member has a pair of opposite ends, wherein said second supporting means includes a pair of opposed latching arms that straddle said ends when said door is in said closed position, and wherein said latching member includes a latching rod having opposite end portions and movable laterally between said first and second positions, said rod when in said first position being disposed adjacent to said first processing member with said end portions engaged by said arms.

6. The improvement claimed in claim 5 wherein said pressure-applying means includes a centrally located pressure-applying member on said latching rod, said rod being rotatable while in said first position to move said pressure-applying member between an inoperative position out of engagement with said first processing member and an operative position in engagement with said first processing member to urge said first processing member toward said second processing member.

7. The improvement claimed in claim 6 further comprising externally accessible operating means for moving said latching rod laterally between said first and second positions and for rotating said latching rod while in said first position to move said pressure-applying member between said inoperative and operative positions.

8. The improvement claimed in claim 7 wherein said latching rod has first and second opposite ends, and wherein said operating means includes an arcuately movable lever connected to said first end.

9. The improvement claimed in claim 8 further comprising a coordinating lever attached to said second end to coordinate movement of said second end with movement of said first end.

* * * * *